US008034392B2

(12) United States Patent
Ichiyama et al.

(10) Patent No.: US 8,034,392 B2
(45) Date of Patent: Oct. 11, 2011

(54) OIL-IN-WATER TYPE EMULSION

(75) Inventors: Hiroyuki Ichiyama, Izumisano (JP); Hiroshi Hidaka, Izumisano (JP)

(73) Assignee: Fuji Oil Company, Limited, Osaka (JP)

( * ) Notice: Subject to any disclaimer, the term of this patent is extended or adjusted under 35 U.S.C. 154(b) by 1175 days.

(21) Appl. No.: 10/584,298

(22) PCT Filed: Jan. 20, 2005

(86) PCT No.: PCT/JP2005/000643
§ 371 (c)(1),
(2), (4) Date: Jun. 23, 2006

(87) PCT Pub. No.: WO2005/070228
PCT Pub. Date: Aug. 4, 2005

(65) Prior Publication Data
US 2007/0071873 A1 Mar. 29, 2007

(30) Foreign Application Priority Data

Jan. 26, 2004 (JP) ................ 2004-016490
Mar. 18, 2004 (JP) ................ 2004-078093
Jun. 25, 2004 (JP) ................ 2004-187656
Sep. 30, 2004 (JP) ................ 2004-286294

(51) Int. Cl.
*A23D 7/00* (2006.01)

(52) U.S. Cl. ......... 426/602; 426/541; 426/564; 426/585

(58) Field of Classification Search .......... 426/601–604, 426/541–542, 564, 585
See application file for complete search history.

(56) References Cited

U.S. PATENT DOCUMENTS

| 3,488,198 | A | * | 1/1970 | Bundus | 426/585 |
| 4,337,278 | A | * | 6/1982 | Brog | 426/583 |
| 4,350,715 | A | * | 9/1982 | Rek | 426/570 |
| 4,397,927 | A | * | 8/1983 | Brog | 426/583 |
| 4,446,164 | A | * | 5/1984 | Brog | 426/583 |
| 4,447,463 | A | * | 5/1984 | Antenore et al. | 426/603 |
| 4,716,047 | A | * | 12/1987 | Biernoth et al. | 426/603 |
| 5,393,551 | A | * | 2/1995 | Arcadipane | 426/585 |
| 6,680,600 | B2 | * | 1/2004 | Emori et al. | 320/126 |
| 6,793,955 | B1 | * | 9/2004 | Landon | 426/581 |
| 7,452,549 | B2 | * | 11/2008 | Hasler-Nguyen et al. | 424/439 |
| 2001/0043980 | A1 | * | 11/2001 | Merrick et al. | 426/613 |

FOREIGN PATENT DOCUMENTS

| GB | 2021140 | * | 11/1979 |
| JP | 10-183164 | | 7/1998 |
| JP | 11-341971 | | 12/1999 |
| JP | 2001-218558 | | 8/2001 |
| JP | 2001-262181 | | 9/2001 |
| JP | 2003-033164 | | 2/2003 |

OTHER PUBLICATIONS

Aini, I. Nor et al. 1999. JAOCS 76(5)643-648.*
Francis, F., 2000. Food Science and Technology, vol. 3, 2nd edition. John Wiley & Sons, Inc., New York, p. 1796-1801.*
Kheiri, M. S. A. 1985, JAOCS 62(2)410-416.*
Duns, M. 1985. JOACS 62(2)408-410.*
Potter, N. 1973. Food Science, $2^{nd}$ edition. The Avi Publishing Company, Westport, CT. p. 142.*
Firestone, D. 1999. Physical and Chemical Characteristics of Oils, Fats and Waxes. AOCS Press, Champaign, Ill. p. 70 & 113.*
Potter, N. 1973. Food Science, 2nd edition. The AVI Publishing Company, Inc., Westport, CT. p. 147.*
Swern, D. 1979. Bailey's Industrial Oil and Fat Products, vol. 1. John Wiley & Sons, New York. p. 315 & 318.*
Database WPI Week 198104, Derwent Publications Ltd., London, GB; AN 1981-04647D, XP002426331 & JP 55 148055 A (Asahi Denka Kogyo KK) Nov. 18, 1980 *abstract*.
Database WPI Week 198104, Derwent Publications Ltd., London, GB; AN 1981-04648D, XP002426332 & JP 55 148056 A (Asahi Denka Kogyo KK) Nov. 19, 1980 *abtsract*.
Database WPI Week 197817, Derwent Publications Ltd., London, GB; AN 1978-30724A, XP002426333 & JP 53 026803 A (Asahi Electrochemical Co Ltd) Mar. 13, 1978 *abstract*.

* cited by examiner

*Primary Examiner* — Carolyn Paden
(74) *Attorney, Agent, or Firm* — Wenderoth, Lind & Ponack, L.L.P.

(57) ABSTRACT

The present invention provides an oil-in-water type emulsion for light-exposing food having photodegradation-resistance, which has good taste and flavor with less deterioration such as off-taste and off-flavor even when irradiating light from a fluorescent lamp, etc. The first embodiment thereof is an oil-in-water type emulsion for light-exposing food containing fat and nonfat milk solids, wherein the fat is non-milk fat, or non-milk fat and milk fat, and the non-milk fat has such a constituent fatty acid composition that the total amount of lauric acid and palmitic acid is not less than 40%, the total amount of oleic acid, linoleic acid and linolenic acid is not more than 50% and the total amount of linoleic acid and linolenic acid is not more than 5%; and the ratio of milk fat/total fat is not more than 0.95. The second embodiment thereof is a nonfat milk solid-containing oil-in-water type emulsion for light-exposing food, which is the same as the emulsion of the first embodiment and the fat is non-milk fat having the above constituent fatty acid composition.

14 Claims, No Drawings

OIL-IN-WATER TYPE EMULSION

TECHNICAL FIELD

The present invention relates to an oil-in-water type emulsion for light-exposing food having photodegradation-resistance, which has less deterioration such as off-taste and off-flavor even when irradiating light from a fluorescent lamp, etc. The present invention further relates to an oil-in-water type emulsion, in particular, a whippable oil-in-water type emulsion (whipping cream) to be used for decorating a cake, as a sandwich filling, etc.

The present invention also relates to a nonfat milk solid-containing oil-in-water type emulsion, which can be used as a substitute for cow milk and concentrated milk, and is suitable for topping on dessert such as pudding, jelly, etc., and blending into pudding, bavarois, jelly, etc.

BACKGROUND ART

Recently, in a confectionery shop at the basement of a department store, a convenience store, a supermarket, or the like, there have been more opportunities to sell various kinds of food on display in a showcase by lighting up with a strong fluorescent lamp for prolonged periods of time to put them look better, from reasons to emphasize the freshness and safety of food and to help consumers have a sense of safety. Dessert and cakes such as pudding, coffee jelly, fruit juice jelly, mousse, etc., on which cream of an oil-in-water type emulsion is topped are also included in these kinds of food (herein, sometimes, referred to as light-exposing food), and a whippable oil-in-water type emulsion is used in cakes. In this case, an ingredient in food on display is changed due to energy provided by irradiation of light, which causes off-taste and off-flavor. The phenomenon of food deterioration by causing off-taste and off-flavor in this way is generally called photodegradation. This phenomenon reduces a commercial value of food by deteriorating taste, and thus preventive measures against photodegradation present a great challenge in quality preservation. In particular, cream of an oil-in-water type emulsion to be used for topping of dessert and a whippable oil-in-water type emulsion to be used for cake are highly likely affected by photo-irradiation due to be in position easy to be exposed to photo-irradiation.

Further, the above-described pudding is one kind of dessert and attracts kids and adults with its taste, mouthfeel and the like. To meet their preferences and demands, a variety of formulations of ingredients and production processes have been proposed. Pudding can be divided into two main types, one is a custard type hardened by thermocoagulation of eggs, and the other is a gel type hardened by a gelling agent. The custard type is made of eggs, milk products and sugars as main ingredients. Examples of the eggs include whole egg, egg yolk, egg white and the like, and examples of the milk products include cow milk, concentrated milk, whole milk powder, skim milk powder, fresh cream, compound cream, vegetable cream, natural cheese, processed cheese, cheese foods and the like. While cow milk is used as direct drinks, it is also used as a blending material into pudding, bavarois, jelly, etc. The gel type is made of milk products, a gelling agent and sugars as main ingredients. Examples of the gelling agent include gelatin, carrageenan, etc. Recently, in a confectionery shop at the basement of a department store, a convenience store, a supermarket, etc., various kinds of food are sold on display in a showcase by lighting up with a strong fluorescent lamp for prolonged periods of time. Pudding is also one of those kinds of food. In this case, an ingredient in food on display is changed due to energy provided by irradiation of light, which causes off-taste and off-flavor. The phenomenon of food deterioration by causing off-taste and off-flavor in this way is generally called photodegradation. This phenomenon reduces a commercial value of food by deteriorating taste, and thus preventive measures against photodegradation present a great challenge in quality preservation.

To prevent the photodegradation, various agents for preventing taste deterioration have been added to food as a substance having a preventive effect against photodegradation. For example, in JP 2003-33164 A, myricetin and quercetin are used together in a specific blend ratio; in JP 11-341971 A, propolis is used; and in JP 10-183164 A, at least one ingredient selected from chlorogenic acid, caffeic acid, and ferulic acid is used. However, the amount of the agent to be used has restricted because its taste comes out if it is added too much, and especially in an oil-in-water type emulsion, a sufficient effect has hardly been able to be achieved only by the agent.

OBJECTS OF THE INVENTION

An object of the present invention is to provide an oil-in-water type emulsion for light-exposing food having photodegradation-resistance, which has less deterioration such as off-taste and off-flavor even when irradiating light from a fluorescent lamp, etc., and has excellent taste. Another object is to provide a whippable oil-in-water type emulsion (whipping cream) to be used for decorating a cake, as sandwich filling, etc.

Still another object of the present invention is to provide a nonfat milk solid-containing oil-in-water type emulsion, which can be used as a substitute for cow milk and concentrated milk and has less deterioration such as off-taste and off-flavor by photo-irradiation from a fluorescent lamp, etc., and has excellent taste.

These objects as well as other objects and advantages of the present invention will be apparent to those skilled in the art from the following description.

SUMMARY OF THE INVENTION

As a result of intensive investigations to the above-described objects, the present inventors have found that, when using fat having a specific constituent fatty acid composition in an oil-in-water type emulsion comprising fat and nonfat milk solids, the emulsion has photodegradation-resistance as has less deterioration such as off-taste and off-flavor even when exposed to photo-irradiation. The present inventors also have found that deterioration can further be prevented by incorporating a specific taste deterioration preventing agent. Thus, the present invention has been completed.

That is, the first aspect of the present invention is an oil-in-water type emulsion for light-exposing food comprising fat and nonfat milk solids, wherein the fat consists of non-milk fat, or non-milk fat and milk fat; the non-milk fat has such a constituent fatty acid composition that the total amount of lauric acid and palmitic acid is not less than 40%, the total amount of oleic acid, linoleic acid and linolenic acid is not more than 50%, and the total amount of linoleic acid and linolenic acid is not more than 5%; and the ratio of milk fat/total fat is not more than 0.95. The second aspect is the oil-in-water type emulsion according to the first aspect, wherein the oil-in-water type emulsion further comprises at least one ingredient selected from tocopherol and rutin. The third aspect is the oil-in-water type emulsion according to the first or second aspect, which is for photodegradation-resistance. The fourth aspect is the oil-in-water type emulsion according to any one of the first to third aspects, wherein the oil-in-water type emulsion is whippable. The fifth aspect is a method for preventing photodegradation of an oil-in-water type emulsion comprising fat, nonfat milk solids, water and an emulsifier, which comprises: using as the fat that consisting of non-milk fat, or non-milk fat and milk fat, wherein the non-milk fat has such a constituent fatty acid composition that the total amount of lauric acid and palmitic acid is not less than 40%, the total amount of oleic acid, linoleic acid and linolenic acid is not more than 50% and the total amount of linoleic acid and linolenic acid is not more than 5%; and the ratio of milk fat/total fat is not more than 0.95. The sixth aspect is the method according to the fifth aspect, wherein the oil-in-water type emulsion further comprises at least one ingredient selected from tocopherol and rutin. The seventh aspect is the oil-in-water type emulsion according to the first aspect, wherein the fat is non-milk fat and the emulsion is a nonfat milk solid-containing oil-in-water type emulsion comprising 1 to 12% by weight of fat and 3 to 26% by weight of nonfat milk solids; and the non-milk fat has such a constituent fatty acid composition that the total amount of lauric acid and palmitic acid is not less than 40%, the total amount of oleic acid, linoleic acid and linolenic acid is not more than 50% and the total amount of linoleic acid and linolenic acid is not more than 5%. The eighth aspect is the oil-in-water type emulsion according to the seventh aspect, wherein the nonfat milk solid-containing oil-in-water type emulsion further comprises tocopherol. The ninth aspect is the oil-in-water type emulsion according to the seventh aspect, which is an emulsion for blending use. The tenth aspect is the oil-in-water type emulsion according to the seventh aspect, which is an emulsion for blending into pudding, bavarois or jelly.

According to the present invention, it is possible to provide an oil-in-water type emulsion having photodegradation-resistance, which has less deterioration such as off-taste and off-flavor even when irradiating light from a fluorescent lamp, etc., and has excellent taste, and further an oil-in-water type emulsion, which is a whippable oil-in-water type emulsion (whipping cream) to be used for decorating a cake, as sandwich filling, etc., as well as a method for preventing photodegradation of an oil-in-water type emulsion.

Further, it is possible to provide a nonfat milk solid-containing oil-in-water type emulsion having photodegradation-resistance, which has less deterioration such as off-taste and off-flavor even when irradiating light from a fluorescent lamp, etc., and has excellent taste, and further a nonfat milk solid-containing oil-in-water type emulsion, which is used for blending into pudding, bavarois, jelly, etc.

DETAILED DESCRIPTION OF THE INVENTION

The First Embodiment

The oil-in-water type emulsion according to the first embodiment is for light-exposing food and comprises fat and nonfat milk solids, wherein the fat (hereinafter, sometimes, referred to as the fat ingredient) consists of non-milk fat, or non-milk fat and milk fat; the non-milk fat has such a constituent fatty acid composition that the total amount of lauric acid and palmitic acid is not less than 40%, the total amount of oleic acid, linoleic acid and linolenic acid is not more than 50%, and the total amount of linoleic acid and linolenic acid is not more than 5%; and the ratio of milk fat/total fat is not more than 0.95. The ratio of the nonfat milk solids to the fat ingredient in the oil-in-water type emulsion is less than 1 relative to 1 of the fat ingredient.

Further, the oil-in-water type emulsion of the present invention can be prepared as a whippable emulsion. Such an oil-in-water type emulsion is also called as "whipping cream." When the emulsion is stirred with a beater or a special mixer so as to incorporating air therein, it becomes a whipped state so-called "whipped cream" or "whip cream".

As the fat ingredient of the present invention, any fat can be selected and used as long as the non-milk fat in the fat ingredient has such a constituent fatty acid composition that the total amount of lauric acid and palmitic acid is not less than 40%, the total amount of oleic acid, linoleic acid and linolenic acid is not more than 50%, and the total amount of linoleic acid and linolenic acid is not more than 5%. Preferably, the non-milk fat in the fat ingredient has such a constituent fatty acid composition that the total amount of lauric acid and palmitic acid is not less than 50%, more preferably not less than 55%, the total amount of oleic acid, linoleic acid and linolenic acid is not more than 40%, more preferably not more than 35%, and the total amount of linoleic acid and linolenic acid is not more than 4%, more preferably not more than 3%. Specifically, for example, animal and vegetable fat, hydrogenated fat thereof, and various chemically or physically processed products thereof can be used alone or in combination of two or more thereof. Examples of the source of the fat include various animal and vegetable fat such as soybean oil, cottonseed oil, corn oil, safflower oil, olive oil, palm oil, rapeseed oil, rice bran oil, sesame oil, kapok oil, palm oil, palm kernel oil, lard, fish oil, whale oil, etc., and their processed products (having melting point of about 15 to 40° C.) such as hydrogenated, fractioned, or interesterified oil thereof.

The amount of the fat ingredient is 10 to 50% by weight, preferably 13 to 48% by weight, and more preferably 15 to 48% by weight. When the fat ingredient is larger than the upper limit, the oil-in-water type emulsion or the whippable oil-in-water type emulsion is apt to become "thicken (plasticized state)", and when less than the lower limit, in the case of the oil-in-water type emulsion, it is difficult to obtain rich mouthfeel and taste derived from the fat ingredient, and in the case of the whippable oil-in-water type emulsion, whipping property and shape retention tend to be deteriorated.

As used herein, nonfat milk solids are an ingredient remaining after removal of milk fat from whole solids of cow milk. Examples of the raw material containing such ingredient include those derived from milk such as fresh milk, cow milk, defatted milk, fresh cream, concentrated milk, unsweetened condensed milk, sweetened condensed milk, whole milk powder, skim milk powder, buttermilk powder, whey protein, casein, casein sodium, etc. The content of nonfat milk solids is 1 to 14% by weight, more preferably 2 to 12% by weight, and most preferably 4 to 10% by weight. When nonfat milk solids are less than 1% by weight, emulsion stability of the oil-in-water type emulsion is poor, milk taste is subtle and flavor is lost. When higher than 14% by weight, viscosity of the oil-in-water type emulsion is high, a cost is also high, and thus it is difficult to achieve an effect commensurate with an amount.

As the emulsifier to be used in the present invention, an emulsifier usually used in preparation of an oil-in-water type emulsion and a whippable oil-in-water type emulsion can be selected and used appropriately. Examples of the emulsifier include synthetic emulsifiers such as lecithin, monoglyceride, sorbitan fatty acid ester, propylene glycol fatty acid ester, polyglycerol fatty acid ester, polyoxyethylenesorbitan fatty acid ester, sucrose fatty acid ester, etc. Among these emulsifiers, one or more of them may be selected and used appropriately. Among these emulsifiers, from the viewpoint of less deterioration as off-taste and off-flavor by photo-irradiation, an emulsifier free from an unsaturated fatty acid as a constituent fatty acid, for example, a polyglycerol fatty acid ester composed of a saturated fatty acid is preferably used.

When the oil-in-water type emulsion and the whippable oil-in-water type emulsion of the present invention comprise milk fat, these preferably comprise at least one taste deterioration preventing agent selected from tocopherol and rutin.

For the oil-in-water type emulsion and the whippable oil-in-water type emulsion, it is preferable to contain milk fat whenever possible from the viewpoint of taste.

However, although much milk fat is preferable in taste, it is apt to cause photodegradation. When using the fat ingredient of the present invention, from the viewpoint of both excellent taste and photodegradation-resistance, the ratio of milk fat/total fat in the fat ingredient in the oil-in-water type emulsion and the whippable oil-in-water type emulsion that should be not more than 0.95. Within the range of not more than 0.95, the higher ratio tends to be less photodegradation-resistant against photo-irradiation, while it provides better taste before photo-irradiation. The ratio is preferably not more than 0.8, and more preferably not more than 0.7. When the ratio of milk fat/total fat is higher within the range of not more than 0.95, tocopherol and rutin are preferably used together.

Tocopherol to be used in the present invention itself is known and commercially available. It may be purified extract from natural plant or unpurified extract, or may be a synthetic product. In addition, it may be δ-tocopherol alone or a mixture of mixture of α, β, γ and δ-tocopherols, etc., with that containing less α and high δ being preferred. Further, it may be used in the form of a preparation diluted with fat, dextrin, and the like. Examples of a commercial product include Riken Oil Super 80 (trade name, manufactured by Riken Vitamin Co., Ltd.; tocopherol content 64%), and the like.

The amount of tocopherol to be used in the oil-in-water type emulsion of the present invention is 0.04 to 0.5% by weight, preferably 0.05 to 0.45% by weight, and most preferably 0.07 to 0.4% by weight.

When the amount of tocopherol is less than the lower limit, it is difficult to obtain the expected effect, and when higher than the upper limit, whipping property, taste and color of the oil-in-water type emulsion are deteriorated.

Rutin to be used in the present invention itself is known and commercially available. Originally, rutin is scarcely soluble in water, and thus its utilization is left behind. In the present invention, rutin dramatically enhanced its water-solubility by enzyme treatment is suitable, and αG Rutin PS (trade name, manufactured by Toyo Sugar Refining Co., Ltd.; rutin content 82%) is exemplified.

The amount of rutin to be used in the oil-in-water type emulsion of the present invention is within the range of 0.003 to 0.2% by weight, preferably 0.004 to 0.15% by weight, and most preferably 0.005 to 0.10% by weight. When the amount of rutin is less than the lower limit, it is difficult to obtain the expected effect, and when higher than the upper limit, taste and color of the oil-in-water type emulsion are deteriorated.

The above-described taste deterioration preventing agent used in the oil-in-water type emulsion and the whippable oil-in-water type emulsion of the present invention can achieve the desired effect by containing as the effective ingredients tocopherol and/or rutin, and if necessary, a known antioxidant (e.g., L-ascorbic acid, etc.), a flavor deterioration preventing agent (e.g., chlorogenic acid, apple polyphenol, sunflower extract, bayberry extract, etc.), and a metal chelating agent (e.g., gluconic acid, kojic acid, phytic acid, polyphosphoric acid, chitin, chitosan, etc.) may also be used.

Timing of addition of the taste deterioration preventing agent used in the oil-in-water type emulsion and the whippable oil-in-water type emulsion of the present invention is not specifically limited, but should be before the oil-in-water type emulsion and the whippable oil-in-water type emulsion are undergone photodegradation. The taste deterioration-preventing agent may be added when preparing the oil-in-water type emulsion and the whippable oil-in-water type emulsion. In the case of the whippable oil-in-water type emulsion, the taste deterioration-preventing agent may be added when whipping the whippable oil-in-water type emulsion after preparation. Preferably, it is blended together with other ingredients when preparing the whippable oil-in-water type emulsion.

In the oil-in-water type emulsion and the whippable oil-in-water type emulsion of the present invention, various salts can be used. As the salts, preferably, hexametaphosphate, secondary phosphate, sodium citrate, polyphosphate, sodium bicarbonate, etc., can be used alone or in combination of two or more thereof. If necessary, other ingredients such as sugars, a stabilizer, a flavor, a colorant and a preservative may also be used.

As the process for producing the oil-in-water type emulsion and the whippable oil-in-water type emulsion of the present invention, after mixing ingredients, mainly, the fat ingredient, nonfat milk solids, the emulsifier and water, the mixture can be subjected to pre-emulsifying treatment and then pasteurizing or sterilizing treatment, followed by homogenization. From the viewpoint of storing property of the whippable oil-in-water type emulsion, sterilizing treatment is preferred. Specifically, the ingredients are pre-emulsified at 60 to 70° C. for 20 minutes (the emulsifying apparatus is a homomixer), and if necessary, homogenized under conditions of 0 to 250 kg/cm$^2$ (the emulsifying apparatus is a homogenizer). Then, the mixture is treated with ultra high temperature heating (UHT) sterilization, and then homogenized again under conditions of 0 to 300 kg/cm$^2$, cooled and then aged for about 24 hours.

There are two methods of ultra high temperature heating (UHT) sterilization, i.e., indirect heating and direct heating. Examples of an indirect heating apparatus include, but not limited to, APV plate-type UHT treatment apparatus (manufactured by APV Co., Ltd.), CP-UHT sterilizer (manufactured by Climaty Package Co., Ltd.), Stork tubular-type sterilizer (manufactured by Stork Food & Dairy Systems Inc.), Contherm scraped surface UHT sterilizer (manufactured by Tetra pak Alfa-Laval Co., Ltd.) and the like. Examples of a direct heating sterilizer include UHT sterilizer such as ultra high temperature Pasteurizer (manufactured by IWAI Engineering System Co., Ltd.), Uperization sterilizer (manufactured by Tetra pak Alfa-Laval Co., Ltd.), VTIS sterilizer (manufactured by Tetra pak Alfa-Laval Co., Ltd.), Lagear UHT sterilizer (manufactured by Lagear Co., Ltd.), Paralyzator (manufactured by Pash and Silkevogue Co., Ltd.) and the like. Any of these apparatuses may be used.

The overrun of the whippable oil-in-water type emulsion of the present invention is 40 to 400%, preferably 60 to 300%, more preferably 60 to 200% and most preferably 60 to 150%. Too high overrun tends to result in too light mouthfeel and/or subtle taste. Too low overrun tends to result in too heavy texture, which makes it difficult to obtain good taste and/or good meltability in the mouth.

The following Examples further illustrate the present invention in detail, but they do not limit by any means the scope of the present invention. In the following Examples, all the "parts" and "percents" are by weight.

In particularly, obviously, the order of addition of additives, or emulsification, e.g., addition of an oil phase to an aqueous phase or vice versa is not limited by the following Examples. The results were evaluated according to the following methods.

A. Evaluation Method of Oil-in-Water Type Emulsion

Assuming that an oil-in-water type emulsion (cream) was topping on dessert such as pudding, coffee jelly, fruit juice jelly and mousse, 30 g of the oil-in-water type emulsion was placed in Clean Cup 120BL manufactured by Risu Pack Co., Ltd., and subjected to two kinds of taste evaluation of before and after photo-irradiation. Photo-irradiation test was conducted with irradiation from a fluorescent lamp (illuminance: 4000 Lx) and evaluations were conducted after storage at a temperature of 5° C. for 12, 24 and 72 hours. Taste evaluation was based on 5-point scale of "5", "4", "3", "2" and "1" with a higher score assigned for better. An average evaluation was considered as the result. For taste evaluation, an organoleptic test was conducted by 20 expert panelists.

B. Evaluation Method of Oil-in-Water Type Emulsion Upon Whipped (1) Whipping time: time to achieve the best-whipped state for 1 kg of an oil-in-water type emulsion added with 80 g of granulated sugar by whipping with a Hobart-mixer (manufactured by HOBART CORPORATION, MODEL N-5) at scale 3 (300 rpm).

(2) Overrun: [(weight of the oil-in-water type emulsion in a given volume)—(weight of the whipped material in the given volume after whipping)]÷(weight of the whipped material in the given volume after whipping)×100

(3) Shape retention: The appearance of a whipped and shaped material after storage at 15° C. for 24 hours was evaluated. Evaluation is based on 3-point scale of "excellent", "good", "poor" with a higher score assigned for better.

(4) Taste: An organoleptic test was conducted by 20 expert panelists. Two kinds of taste evaluation of immediately after whipping and after photo-irradiation were conducted. Photo-irradiation test was conducted with irradiation from a fluorescent lamp (illuminance: 4000 Lx), and evaluations were conducted after storage at a temperature of 5° C. for 12, 24 and 72 hours. Taste evaluation was based on 5-point scale of "5", "4", "3", "2" and "1" with a higher score assigned for better. An average evaluation was considered as the result.

TEST EXAMPLE 1

According to a conventional method, the constituent fatty acid compositions of palm mid-fraction (melting point 34° C.), hydrogenated palm kernel oil (melting point 34° C.), milk fat and hydrogenated rapeseed oil (melting point 35° C.) to be used as the fat ingredient for preparing an oil-in-water type emulsion and a whippable oil-in-water type emulsion were determined by methyl-esterifying these fats, analyzing by gas chromatography, and identifying and calculating components and their percentages from the area ratios of the analyzed charts.

Among fatty acids determined, percentages of lauric acid+palmitic acid, oleic acid+linoleic acid+linolenic acid, linoleic acid+linolenic acid are summarized in Table 1.

TABLE 1

|  | Lauric acid + palmitic acid | Oleic acid + linoleic acid + linolenic acid | Linoleic acid + linolenic acid |
| --- | --- | --- | --- |
| Palm mid-fraction (melting point 34° C.) | 56.1 | 36.7 | 3.2 |

TABLE 1-continued

|  | Lauric acid + palmitic acid | Oleic acid + linoleic acid + linolenic acid | Linoleic acid + linolenic acid |
| --- | --- | --- | --- |
| Hydrogenated palm kernel oil (melting point 34° C.) | 56 | 5.4 | 0.2 |
| Milk fat | 30.1 | 27.1 | 2.7 |
| Hydrogenated rapeseed oil (melting point 35° C.) | 4.2 | 81.7 | 6.2 |

EXAMPLE 1

An oil phase was prepared by mixing 10.0 parts of palm mid-fraction (melting point 34° C.) and 10.0 parts of hydrogenated palm kernel oil (melting point 34° C.), and melting the mixture. Separately, an aqueous phase was prepared by dissolving 5.0 parts of skim milk powder, 0.2 pat of pentaglycerol monomyristate and 0.1 part of sodium metaphosphate in 74.7 parts of water. The oil phase and the aqueous phase were pre-emulsified by stirring with a homomixer at 65° C. for 30 minutes, sterilized by direct heating with a ultra high temperature heater (manufactured by IWAI Engineering System Co., Ltd.) at 145° C. for 4 seconds, homogenized at homogenizing pressure of 30 kg/cm$^2$, and then immediately cooled to 5° C. After cooling, the product was aged for 24 hours to obtain an oil-in-water type emulsion. The emulsion was evaluated according to the above A. Evaluation method of oil-in-water type emulsion. The results are summarized in Table 2.

EXAMPLE 2

According to the same manner as that described in Example 1, an oil-in-water type emulsion according to Example 2 was obtained except that 10.0 parts of palm mid-fraction (melting point 34° C.) and 10.0 parts of hydrogenated palm kernel oil (melting point 34° C.) in Example 1 were replaced by 14.0 parts of palm mid-fraction (melting point 34° C.) and 6.0 parts of hydrogenated palm kernel oil (melting point 35° C.). The emulsion was evaluated according to the above A. Evaluation method oil-in-water type emulsion. The results are summarized n Table 2.

EXAMPLE 3

An oil phase was prepared by adding 0.1 part of tocopherol (trade name: Riken Oil Super 80, manufactured by Riken Vitamin Co., Ltd.; tocopherol content 64%) to 14.0 parts of hydrogenated palm kernel oil (melting point 34° C.) and 6.0 parts of hydrogenated rapeseed oil (melting point 35° C.), and mixing and melting the mixture. Separately, an aqueous phase was prepared by dissolving 5.0 parts of skim milk powder, 0.2 part of pentaglycerol monomyristate and 0.1 part of sodium metaphosphate in 74.6 parts of water. The oil phase and the aqueous phase were pre-emulsified by stirring with a homomixer at 65° C. for 30 minutes, sterilized with a ultra high temperature heater (manufactured by IWAI Engineering System Co., Ltd.) by direct heating at 145° C. for 4 seconds, homogenized at homogenizing pressure of 30 kg/cm$^2$, and then immediately cooled to 5° C. After cooling, the product was aged for 24 hours to obtain an oil-in-water type emulsion. (This oil-in-water type emulsion was that obtained by adding 0.1 part of tocopherol (trade name: Riken Oil Super 80, manufactured by Riken Vitamin Co., Ltd., tocopherol content 64%)

to the oil-in-water type emulsion of Example 2.) The emulsion was evaluated according to the above A. Evaluation method of oil-in-water type emulsion. The results are summarized in Table 2.

COMPARATIVE EXAMPLE 1

According to the same manner as that described in Example 1, an oil-in-water type emulsion was obtained except that 10.0 parts of palm mid-fraction (melting point 34° C.) and 10.0 parts of hydrogenated palm kernel oil (melting point 34° C.) in Example 1 were replaced by 20.0 parts of hydrogenated rapeseed oil (melting point 35° C.). The emulsion was evaluated according to the above A. Evaluation method of oil-in-water type emulsion. The results are summarized in Table 2.

COMPARATIVE EXAMPLE 2

Commercially available fresh cream (manufactured by Yotsuba Nyugyo Co., Ltd., the fat ingredient 47%, nonfat milk solids 5%) was evaluated according to the above A. Evaluation method of oil-in-water type emulsion. The results are summarized in Table 2.

Co., Ltd.) at 145° C. for 4 seconds, homogenized at homogenizing pressure of 30 kg/cm$^2$, and then immediately cooled to 5° C. After cooling, the product was aged for 24 hours to obtain a whippable oil-in-water type emulsion. The emulsion was evaluated according to the above B. Evaluation method of oil-in-water type emulsion upon whipping. The results are summarized in Table 3.

EXAMPLE 5

According to the same manner as that described in Example 4, a whippable oil-in-water type emulsion according to Example 5 was obtained except that 25.0 parts of palm mid-fraction (melting point 34° C.), 5.0 parts of hydrogenated palm kernel oil (melting point 34° C.) and 64.7 parts of water in Example 4 were replaced by 20.0 parts of palm mid-fraction (melting point 34° C.), 20.0 parts of hydrogenated palm kernel oil (melting point 34° C.) and 54.7 parts of water. The emulsion was evaluated according to the above B. Evaluation method of oil-in-water type emulsion upon whipping. The results are summarized in Table 3.

EXAMPLE 6

An oil phase was prepared by adding 0.1 part of tocopherol (trade name: Riken Oil Super 80, manufactured by Riken

TABLE 2

| | Examples | | | Comparative Example 1 | Comparative Example 2 |
|---|---|---|---|---|---|
| | 1 | 2 | 3 | | |
| Oil phase | | | | | |
| Palm mid-fraction (melting point 34° C.) | 10.0 | — | — | — | — |
| Hydrogenated palm kernel oil (melting point 34° C.) | 10.0 | 14.0 | 14.0 | — | — |
| Hydrogenated rapeseed oil (melting point 35° C.) | — | 6.0 | 6.0 | 20.0 | — |
| Fresh cream | — | — | — | — | 100 |
| Lecithin | — | — | — | — | — |
| Riken Oil Super 80 | — | — | 0.1 | — | — |
| Constituent fatty acid composition of non-milk fat in the fat ingredient | | | | | |
| Lauric acid + palmitic acid | 56.1 | 40.5 | 40.5 | 4.2 | |
| Oleic acid + linoleic acid + linolenic acid | 21.1 | 28.3 | 28.3 | 81.7 | |
| Linoleic acid + linolenic acid | 1.7 | 2.0 | 2.0 | 6.2 | |
| Milk fat/total fat | 0.00 | 0.00 | 0.00 | 0.00 | 1.00 |
| Aqueous phase | | | | | |
| Water | 74.7 | 74.7 | 74.6 | 74.7 | — |
| Skim milk powder | 5 | 5 | 5 | 5 | — |
| Pentaglycerol monomyristate (HLB13) | 0.2 | 0.2 | 0.2 | 0.2 | — |
| αG rutin PS | — | — | — | — | — |
| Sodium metaphosphate | 0.1 | 0.1 | 0.1 | 0.1 | — |
| Taste before photo-irradiation | 4.0 | 3.6 | 3.6 | 3.2 | 5.0 |
| Taste after 12 hours photo-irradiation | 4.0 | 3.6 | 3.6 | 3.2 | 1.8 |
| Taste after 24 hours photo-irradiation | 4.0 | 3.5 | 3.6 | 2.9 | 1.4 |
| Taste after 72 hours photo-irradiation | 3.9 | 3.0 | 3.6 | 2.5 | 0.9 |

EXAMPLE 4

An oil phase was prepared by mixing 25.0 parts of palm mid-fraction (melting point 34° C.) and 5.0 parts of hydrogenated palm kernel oil (melting point 34° C.) and melted the mixture. Separately, an aqueous phase was prepared by dissolving 5.0 parts of skim milk powder, 0.2 part of pentaglycerol monomyristate and 0.1 part of sodium metaphosphate in 64.7 parts of water. The oil phase and the aqueous phase were pre-emulsified by stirring with a homomixer at 65° C. for 30 minutes, sterilized by direct heating with a ultra high temperature heater (manufactured by IWAI Engineering System Vitamin Co., Ltd.; tocopherol content 64%) to 25.0 parts of palm mid-fraction (melting point 34° C.) and 5.0 parts of hydrogenated palm kernel oil (melting point 34° C.), and mixing and melting the mixture. Separately, an aqueous phase was prepared by dissolving 5.0 parts of skim milk powder, 0.2 part of pentaglycerol monomyristate and 0.1 part of sodium metaphosphate in 64.6 parts of water. The oil phase and the aqueous phase were pre-emulsified by stirring with a homomixer at 65° C. for 30 minutes, sterilized by direct heating with a ultra high temperature heater (manufactured by IWAI Engineering System Co., Ltd.) at 145° C. for 4 seconds, homogenized at homogenizing pressure of 30 kg/cm², and then immediately cooled to 5° C. After cooling, the product was aged for 24 hours to obtain a whippable oil-in-water type emulsion. The emulsion was evaluated according to the above B. Evaluation method of oil-in-water type emulsion upon whipping. The results are summarized in Table 3.

EXAMPLE 7

An oil phase was prepared by mixing 25.0 parts of palm mid-fraction (melting point 34° C.) and 5.0 parts of hydrogenated palm kernel oil (melting point 34° C.) and melting the mixture. Separately, an aqueous phase was prepared by dissolving 5.0 parts of skim milk powder, 0.2 part of pentaglycerol monomyristate, 0.1 part of sodium metaphosphate and 0.01 part of rutin (trade name: aG rutin PS, manufactured by Toyo Sugar Refining Co., Ltd., rutin content 82%) in 64.7 parts of water. The oil phase and the aqueous phase were pre-emulsified by stirring with a homomixer at 65° C. for 30 minutes, sterilized by direct heating with a ultra high temperature heater (manufactured by IWAI Engineering System Co., Ltd.) at 145° C. for 4 seconds, homogenized at homogenizing pressure of 30 kg/cm², and then immediately cooled to 5° C. After cooling, the product was aged for 24 hours to obtain a whippable oil-in-water type emulsion. The emulsion was evaluated according to the above B. Evaluation method of oil-in-water type emulsion upon whipping. The results are summarized in Table 3.

EXAMPLE 8

The whippable oil-in-water type emulsion obtained in Example 4 was evaluated according to the above B. Evaluation method of oil-in-water type emulsion upon whipping, provided that, in Example 8, the emulsion was whipped without addition of granulated sugar, while 80 g of granulated sugar was usually added to 1 kg of an oil-in-water type emulsion. The results are summarized in Table 3.

EXAMPLE 9

To the whippable oil-in-water type emulsion obtained in Example 4 was added 0.1 part of tocopherol (trade name: Riken Oil Super 80, manufactured by Riken Vitamin Co., Ltd.; tocopherol content 64%) per 100 parts of the emulsion upon whipping, and evaluated according to the above B. Evaluation method of oil-in-water type emulsion upon whipping. The results are summarized in Table 3.

TABLE 3

|  | Examples |  |  |  |  |  |
|---|---|---|---|---|---|---|
|  | 4 | 5 | 6 | 7 | 8 | 9 |
| Oil phase |  |  |  |  |  |  |
| Palm mid-fraction (melting point 34° C.) | 25.0 | 20.0 | 25.0 | 25.0 | Emulsion in Example 4 whipped without addition of granulated sugar | Composition and process described above |
| Hydrogenated palm kernel oil (melting point 34° C.) | 5.0 | 20.0 | 5.0 | 5.0 |  |  |
| Hydrogenated rapeseed oil (melting point 35° C.) | — | — | — | — |  |  |
| Fresh cream | — | — | — | — |  |  |
| Lecithin | — | — | — | — |  |  |
| Riken Oil Super 80 | — | — | 0.1 | — |  |  |
| Constituent fatty acid composition of non-milk fat in the fat ingredient |  |  |  |  |  |  |
| Lauric acid + palmitic acid | 56.1 | 56.1 | 56.1 | 56.1 | 56.1 | 56.1 |
| Oleic acid + linoleic acid + linolenic acid | 31.5 | 21.1 | 31.5 | 31.5 | 31.5 | 31.5 |
| Linoleic acid + linolenic acid | 2.7 | 1.7 | 2.7 | 2.7 | 2.7 | 2.7 |
| Milk fat/total fat | 0.00 | 0.00 | 0.00 | 0.00 | 0.00 | 0.00 |
| Aqueous phase |  |  |  |  |  |  |
| Water | 64.7 | 54.7 | 64.6 | 64.7 |  |  |
| Skim milk powder | 5 | 5 | 5 | 5 |  |  |
| Pentaglycerol monomyristate (HLB13) | 0.2 | 0.2 | 0.2 | 0.2 |  |  |
| αG rutin PS | — | — | — | 0.01 |  |  |
| Sodium metaphosphate | 0.1 | 0.1 | 0.1 | 0.1 |  |  |
| Whipping time | 3'30" | 2'30" | 3'28" | 3'35" | 3'37" | 3'35" |
| Overrun (%) | 110 | 90 | 112 | 107 | 113 | 115 |
| Shape retention at 15° C. | Excellent | Excellent | Excellent | Excellent | Excellent | Excellent |
| Taste immediately after whipping | 4.3 | 4.1 | 4.3 | 4.3 | 4.3 | 4.3 |
| Taste after 12 hours photo-irradiation | 4.2 | 4.0 | 4.3 | 4.3 | 4.2 | 4.3 |
| Taste after 24 hours photo-irradiation | 4.1 | 3.8 | 4.3 | 4.2 | 4.1 | 4.3 |
| Taste after 72 hours photo-irradiation | 3.9 | 3.5 | 4.2 | 4.2 | 3.9 | 4.2 |

EXAMPLE 10

An oil phase was prepared by adding 0.1 part of tocopherol (trade name: Riken Oil Super 80, manufactured by Riken Vitamin Co., Ltd.; tocopherol content 64%) to 2.5 parts of palm mid-fraction (melting point 34° C.) and 0.5 parts of hydrogenated palm kernel oil (melting point 34° C.), and mixing and melting the mixture. Separately, an aqueous phase was prepared by dissolving 0.5 part of skim milk powder, 0.02 part of pentaglycerol monomyristate, 0.1 part of sodium metaphosphate and 0.01 part of rutin (trade name: αG rutin PS, manufactured by Toyo Sugar Refining Co., Ltd., rutin content 82%) in 6.27 parts of water. The oil phase, the aqueous phase and 90 parts of commercially available fresh cream (manufactured by Yotsuba Nyugyo Co., Ltd., the fat ingredient 47%, nonfat milk solids 5%) were pre-emulsified by stirring with a homomixer at 65° C. for 30 minutes, sterilized by direct heating with a ultra high temperature heater (manufactured by IWAI Engineering System Co., Ltd.) at 145° C. for 4 seconds, homogenized at homogenizing pressure of 30 kg/cm², and immediately cooled to 5° C. After cooling, the product was aged for 24 hours to obtain a whippable oil-in-water type emulsion. The emulsion was evaluated according to the above B. Evaluation method of oil-in-water type emulsion upon whipping. The results are summarized in Table 4.

EXAMPLES 11 TO 15

According to the formulations in Table 4 and the same manner as that described in Example 10, whippable oil-in-water type emulsions according to Examples 11 to 15 were obtained. These emulsions were evaluated according to the above B. Evaluation method of oil-in-water type emulsion upon whipping. The results are summarized in Table 4.

sodium metaphosphate and 0.03 part of rutin (trade name: αG rutin PS, manufactured by Toyo Sugar Refining Co., Ltd., rutin content 82%) in 6.05 parts of water. The oil phase, the aqueous phase and 90 parts of commercially available fresh cream (manufactured by Yotsuba Nyugyo Co., Ltd., the fat ingredient 47%, nonfat milk solids 5%) were pre-emulsified by stirring with a homomixer at 65° C. for 30 minutes, sterilized by direct heating with a ultra high temperature heater (manufactured by IWAI Engineering System Co., Ltd.) at 145° C. for 4 seconds, homogenized at homogenizing pressure of 30 Kg/cm², and immediately cooled to 5° C. After cooling, the product was aged for 24 hours to obtain a whippable oil-in-water type emulsion. The emulsion was evaluated according to the above B. Evaluation method of oil-in-

TABLE 4

| | Examples | | | | | |
| --- | --- | --- | --- | --- | --- | --- |
| | 10 | 11 | 12 | 13 | 14 | 15 |
| Oil phase | | | | | | |
| Palm mid-fraction (melting point 34° C.) | 2.5 | 5 | 7.5 | — | — | — |
| Hydrogenated palm kernel oil (melting point 34° C.) | 0.5 | 1.0 | 1.5 | 6.3 | 14.0 | 20.0 |
| Hydrogenated rapeseed oil (melting point 35° C.) | — | — | — | 2.7 | 6.0 | 10.0 |
| Fresh cream | 90 | 80 | 70 | 70 | 50 | 30 |
| Lecithin | — | — | — | — | — | — |
| Riken Oil Super 80 | 0.1 | 0.1 | 0.1 | 0.1 | 0.1 | 0.1 |
| Constituent fatty acid composition of non-milk fat in the fat ingredient | | | | | | |
| Lauric acid + palmitic acid | 56.1 | 56.1 | 56.1 | 40.5 | 40.5 | 40.5 |
| Oleic acid + linoleic acid + linolenic acid | 31.4 | 31.4 | 31.4 | 28.3 | 28.3 | 28.3 |
| Linoleic acid + linolenic acid | 2.7 | 2.7 | 2.7 | 2.0 | 2.0 | 2.0 |
| Milk fat/total fat | 0.93 | 0.86 | 0.79 | 0.79 | 0.54 | 0.32 |
| Aqueous phase | | | | | | |
| Water | 6.27 | 12.75 | 19.23 | 19.23 | 27.19 | 36.24 |
| Skim milk powder | 0.5 | 1 | 1.5 | 1.5 | 2.5 | 3.5 |
| Pentaglycerol monomyristate (HLB13) | 0.02 | 0.04 | 0.06 | 0.06 | 0.10 | 0.15 |
| αG rutin PS | 0.01 | 0.01 | 0.01 | 0.01 | 0.01 | 0.01 |
| Sodium metaphosphate | 0.1 | 0.1 | 0.1 | 0.1 | 0.1 | 0.1 |
| Whipping time | 1'26" | 1'47" | 2'15" | 2'30" | 2'25" | 2'40" |
| Overrun (%) | 75 | 81 | 87 | 95 | 100 | 100 |
| Shape retention at 15° C. | Excellent | Excellent | Excellent | Excellent | Excellent | Excellent |
| Taste immediately after whipping | 4.8 | 4.7 | 4.6 | 4.5 | 4.4 | 4.3 |
| Taste after 12 hours photo-irradiation | 4.0 | 4.4 | 4.5 | 4.5 | 4.3 | 4.3 |
| Taste after 24 hours photo-irradiation | 3.0 | 3.5 | 4.0 | 3.5 | 4.1 | 4.2 |
| Taste after 72 hours photo-irradiation | 1.0 | 1.4 | 2.0 | 1.8 | 2.8 | 3.3 |

EXAMPLE 16

An oil phase was prepared by adding 0.3 part of tocopherol (trade name: Riken Oil Super 80, manufactured by Riken Vitamin Co., Ltd.; tocopherol content 64%) to 2.5 parts of palm mid-fraction (melting point 34° C.) and 0.5 part of hydrogenated palm kernel oil (melting point 34° C.), and mixing and melting the mixture. Separately, an aqueous phase was prepared by dissolving 0.5 part of skim milk powder, 0.02 part of pentaglycerol monomyristate, 0.1 part of water type emulsion upon whipping. The results are summarized in Table 5.

EXAMPLES 17 TO 21

According to the formulations in Table 5 and the same manner as that described in Example 16, whippable oil-in-water type emulsions according to Examples 17 to 21 were obtained. These emulsions were evaluated according to the above B. Evaluation method of oil-in-water type emulsion upon whipping. The results are summarized in Table 5.

TABLE 5

| | Examples | | | | | |
|---|---|---|---|---|---|---|
| | 16 | 17 | 18 | 19 | 20 | 21 |
| Oil phase | | | | | | |
| Palm mid-fraction (melting point 34° C.) | 2.5 | 5 | 7.5 | — | — | — |
| Hydrogenated palm kernel oil (melting point 34° C.) | 0.5 | 1.0 | 1.5 | 6.3 | 14.0 | 20.0 |
| Hydrogenated rapeseed oil (melting point 35° C.) | — | — | — | 2.7 | 6.0 | 10.0 |
| Fresh cream | 90 | 80 | 70 | 70 | 50 | 30 |
| Lecithin | — | — | — | — | — | — |
| Riken Oil Super 80 | 0.3 | 0.3 | 0.3 | 0.3 | 0.3 | 0.3 |
| Constituent fatty acid composition of non-milk fat in the fat ingredient | | | | | | |
| Lauric acid + palmitic acid | 56.1 | 56.1 | 56.1 | 40.5 | 40.5 | 40.5 |
| Oleic acid + linoleic acid + linolenic acid | 31.4 | 31.4 | 31.4 | 28.3 | 28.3 | 28.3 |
| Linoleic acid + linolenic acid | 2.7 | 2.7 | 2.7 | 2.0 | 2.0 | 2.0 |
| Milk fat/total fat | 0.93 | 0.86 | 0.79 | 0.79 | 0.54 | 0.32 |
| Aqueous phase | | | | | | |
| Water | 6.05 | 12.53 | 19.01 | 19.01 | 26.97 | 36.02 |
| Skim milk powder | 0.5 | 1 | 1.5 | 1.5 | 2.5 | 3.5 |
| Pentaglycerol monomyristate (HLB13) | 0.02 | 0.04 | 0.06 | 0.06 | 0.10 | 0.1 |
| αG rutin PS | 0.03 | 0.03 | 0.03 | 0.03 | 0.03 | 0.03 |
| Sodium metaphosphate | 0.1 | 0.1 | 0.1 | 0.1 | 0.1 | 0.1 |
| Whipping time | 1'16" | 1'41" | 2'20" | 2'35" | 2'25" | 2'37" |
| Overrun (%) | 77 | 79 | 85 | 100 | 105 | 113 |
| Shape retention at 15° C. | Excellent | Excellent | Excellent | Excellent | Excellent | Excellent |
| Taste immediately after whipping | 4.8 | 4.7 | 4.6 | 4.5 | 4.4 | 4.3 |
| Taste after 12 hours photo-irradiation | 4.3 | 4.6 | 4.6 | 4.5 | 4.4 | 4.3 |
| Taste after 24 hours photo-irradiation | 3.2 | 3.8 | 4.3 | 3.7 | 4.2 | 4.2 |
| Taste after 72 hours photo-irradiation | 1.2 | 1.7 | 2.5 | 2.2 | 3.0 | 3.5 |

EXAMPLE 22

An oil phase was prepared by adding 0.2 part of tocopherol (trade name: Riken Oil Super 80, manufactured by Riken Vitamin Co., Ltd.; tocopherol content 64%) to 2.5 parts of palm mid-fraction (melting point 34° C.) and 0.5 parts of hydrogenated palm kernel oil (melting point 34° C.), and mixing and melting the mixture. Separately, an aqueous phase was prepared by dissolving 0.5 part of skim milk powder, 0.02 part of pentaglycerol monomyristate and 0.1 part of sodium metaphosphate in 6.18 parts of water. The oil phase, the aqueous phase and 90 parts of commercially available fresh cream (manufactured by Yotsuba Nyugyo Co., Ltd., the fat ingredient 47%, nonfat milk solids 5%) were pre-emulsified by stirring with a homomixer at 65° C. for 30 minutes, sterilized by direct heating with a ultra high temperature heater (manufactured by IWAI Engineering System Co., Ltd.) at 145° C. for 4 seconds, homogenized at homogenizing pressure of 30 kg/cm², and immediately cooled to 5° C. After cooling, the product was aged for 24 hours to obtain a whippable oil-in-water type emulsion. The emulsion was evaluated according to the above B. Evaluation method of oil-in-water type emulsion upon whipping. The results are summarized in Table 6.

EXAMPLES 23 TO 27

According the formulations in Table 6 and the same manner as that described in Example 22, whippable oil-in-water type emulsions according to Examples 23 to 27 were obtained. These emulsions were evaluated according to the above B. Evaluation method of oil-in-water type emulsion upon whipping. The results are summarized in Table 6.

TABLE 6

| | Examples | | | | | |
|---|---|---|---|---|---|---|
| | 22 | 23 | 24 | 25 | 26 | 27 |
| Oil phase | | | | | | |
| Palm mid-fraction (melting point 34° C.) | 2.5 | 5 | 7.5 | — | — | — |
| Hydrogenated palm kernel oil (melting point 34° C.) | 0.5 | 1.0 | 1.5 | 6.3 | 14.0 | 20.0 |
| Hydrogenated rapeseed oil (melting point 35° C.) | — | — | — | 2.7 | 6.0 | 10.0 |
| Fresh cream | 90 | 80 | 70 | 70 | 50 | 30 |
| Lecithin | — | — | — | — | — | — |
| Riken Oil Super 80 | 0.2 | 0.2 | 0.2 | 0.2 | 0.2 | 0.2 |

TABLE 6-continued

|  | Examples | | | | | |
| --- | --- | --- | --- | --- | --- | --- |
|  | 22 | 23 | 24 | 25 | 26 | 27 |
| Constituent fatty acid composition of non-milk fat in the fat ingredient | | | | | | |
| Lauric acid + palmitic acid | 56.1 | 56.1 | 56.1 | 40.5 | 40.5 | 40.5 |
| Oleic acid + linoleic acid + linolenic acid | 31.4 | 31.4 | 31.4 | 28.3 | 28.3 | 28.3 |
| Linoleic acid + linolenic acid | 2.7 | 2.7 | 2.7 | 2.0 | 2.0 | 2.0 |
| Milk fat/total fat | 0.93 | 0.86 | 0.79 | 0.79 | 0.54 | 0.32 |
| Aqueous phase | | | | | | |
| Water | 6.18 | 12.66 | 19.14 | 19.14 | 27.10 | 36.10 |
| Skim milk powder | 0.5 | 1 | 1.5 | 1.5 | 2.5 | 3.5 |
| Pentaglycerol monomyristate (HLB13) | 0.02 | 0.04 | 0.06 | 0.06 | 0.10 | 0.10 |
| αG rutin PS | — | — | — | — | — | — |
| Sodium metaphosphate | 0.1 | 0.1 | 0.1 | 0.1 | 0.1 | 0.1 |
| Whipping time | 1'20" | 1'45" | 2'15" | 2'20" | 2'20" | 2'30" |
| Overrun (%) | 79 | 83 | 85 | 93 | 108 | 110 |
| Shape retention at 15° C. | Excellent | Excellent | Excellent | Excellent | Excellent | Excellent |
| Taste immediately after whipping | 4.8 | 4.7 | 4.6 | 4.5 | 4.4 | 4.3 |
| Taste after 12 hours photo-irradiation | 3.9 | 4.2 | 4.3 | 4.4 | 4.3 | 4.3 |
| Taste after 24 hours photo-irradiation | 2.8 | 3.3 | 3.7 | 3.3 | 4.0 | 4.1 |
| Taste after 72 hours photo-irradiation | 1.0 | 1.3 | 1.8 | 1.6 | 2.6 | 3.0 |

EXAMPLE 28

An oil phase was prepared by mixing 2.5 parts of palm mid-fraction (melting point 34° C.) and 0.5 part of hydrogenated palm kernel oil (melting point 34° C.) and melted the mixture. Separately, an aqueous phase was prepared by dissolving 0.5 part of skim milk powder, 0.02 part of pentaglycerol monomyristate, 0.1 part of sodium metaphosphate and 0.02 part of rutin (trade name: αG rutin PS, manufactured by Toyo Sugar Refining Co., Ltd., rutin content 82%) in 6.36 parts of water. The oil phase, the aqueous phase and 90 parts of commercially available fresh cream (manufactured by Yotsuba Nyugyo Co., Ltd., the fat ingredient 47%, nonfat milk solids 5%) were pre-emulsified by stirring with a homomixer at 65° C. for 30 minutes, sterilized by direct heating with a ultra high temperature heater (manufactured by IWAI Engineering System Co., Ltd.) at 145° C. for 4 seconds, homogenized under at homogenizing pressure of 30 Kg/cm², and immediately cooled to 5° C. After cooling, the product was aged for 24 hours to obtain a whippable oil-in-water type emulsion. The emulsion was evaluated according to the above B. Evaluation method of oil-in-water type emulsion upon whipping. The results are summarized in Table 7.

EXAMPLES 29 TO 33

According to the formulations in Table 7 and the same manner as that in Example 28, whippable oil-in-water type emulsions according to Examples 29 to 33 were obtained. These emulsions were evaluated according to the above B. evaluation method of oil-in-water type emulsion upon whipping. The results are summarized in Table 7.

TABLE 7

|  | Examples | | | | | |
| --- | --- | --- | --- | --- | --- | --- |
|  | 28 | 29 | 30 | 31 | 32 | 33 |
| Oil phase | | | | | | |
| Palm mid-fraction (melting point 34° C.) | 2.5 | 5.0 | 7.5 | — | — | — |
| Hydrogenated palm kernel oil (melting point 34° C.) | 0.5 | 1.0 | 1.5 | 6.3 | 14.0 | 20.0 |
| Hydrogenated rapeseed oil (melting point 35° C.) | — | — | — | 2.7 | 6.0 | 10.0 |
| Fresh cream | 90 | 80 | 70 | 70 | 50 | 30 |
| Lecithin | — | — | — | — | — | — |
| Riken Oil Super 80 | — | — | — | — | — | — |
| Constituent fatty acid composition of non-milk fat in the fat ingredient | | | | | | |
| Lauric acid + palmitic acid | 56.1 | 56.1 | 56.1 | 40.5 | 40.5 | 40.5 |
| Oleic acid + linoleic acid + linolenic acid | 31.4 | 31.4 | 31.4 | 28.3 | 28.3 | 28.3 |
| Linoleic acid + linolenic acid | 2.7 | 2.7 | 2.7 | 2.0 | 2.0 | 2.0 |
| Milk fat/total fat | 0.93 | 0.86 | 0.79 | 0.79 | 0.54 | 0.32 |
| Aqueous phase | | | | | | |
| Water | 6.36 | 12.84 | 19.32 | 19.32 | 27.30 | 36.28 |
| Skim milk powder | 0.5 | 1 | 1.5 | 1.5 | 2.5 | 3.5 |
| Pentaglycerol monomyristate (HLB13) | 0.02 | 0.04 | 0.06 | 0.06 | 0.10 | 0.10 |
| αG rutin PS | 0.02 | 0.02 | 0.02 | 0.02 | 0.02 | 0.02 |

TABLE 7-continued

| | Examples | | | | | |
|---|---|---|---|---|---|---|
| | 28 | 29 | 30 | 31 | 32 | 33 |
| Sodium metaphosphate | 0.1 | 0.1 | 0.1 | 0.1 | 0.1 | 0.1 |
| Whipping time | 1'30" | 1'50" | 2'25" | 2'30" | 2'10" | 2'45" |
| Overrun (%) | 80 | 85 | 88 | 91 | 103 | 110 |
| Shape retention at 15° C. | Excellent | Excellent | Excellent | Excellent | Excellent | Excellent |
| Taste immediately after whipping | 4.8 | 4.7 | 4.6 | 4.5 | 4.4 | 4.3 |
| Taste after 12 hours photo-irradiation | 3.7 | 4.1 | 4.2 | 4.4 | 4.2 | 4.2 |
| Taste after 24 hours photo-irradiation | 2.6 | 3.2 | 3.5 | 3.1 | 3.9 | 4.1 |
| Taste after 72 hours photo-irradiation | 1.0 | 1.3 | 1.7 | 1.5 | 2.4 | 2.8 |

EXAMPLE 34

An oil phase was prepared by adding 0.1 part of tocopherol (trade name: Riken Oil Super 80, manufactured by Riken Vitamin Co., Ltd.; tocopherol content 64%) to 2.0 parts of palm mid-fraction (melting point 34° C.) and 2.0 parts of hydrogenated palm kernel oil (melting point 34° C.), and mixing and melting the mixture. Separately, an aqueous phase was prepared by dissolving 0.5 part of skim milk powder, 0.02 part of pentaglycerol monomyristate, 0.1 part of sodium metaphosphate and 0.01 part of rutin (trade name: αG rutin PS, manufactured by Toyo Sugar Refining Co., Ltd., rutin content 82%) in 5.27 parts of water. The oil phase, the aqueous phase and 90 parts of commercially available fresh cream (manufactured by Yotsuba Nyugyo Co., Ltd., the fat ingredient 47%, nonfat milk solids 5%) were pre-emulsified by stirring with a homomixer at 65° C. for 30 minutes, sterilized by direct heating with a ultra high temperature heater (manufactured by IWAI Engineering System Co., Ltd.) at 145° C. for 4 seconds, homogenized at homogenizing pressure of 30 kg/cm², and immediately cooled to 5° C. After cooling, the product was aged for 24 hours to obtain a whippable oil-in-water type emulsion. The emulsion was evaluated according to the above B. Evaluation method of oil-in-water type emulsion upon whipping. The results are summarized in Table 8.

EXAMPLES 35 AND 36

According to the formulations in Table 8 and the same manner as that described in Example 34, whippable oil-in-water type emulsions according to Examples 35 and 36 were obtained. These emulsions were evaluated according to the above B. Evaluation method of oil-in-water type emulsion upon whipping. The results are summarized in Table 8.

TABLE 8

| | Examples | | |
|---|---|---|---|
| | 34 | 35 | 36 |
| Oil phase | | | |
| Palm mid-fraction (melting point 34° C.) | 2.0 | 4.0 | 6.0 |
| Hydrogenated palm kernel oil (melting point 34° C.) | 2.0 | 4.0 | 6.0 |
| Hydrogenated rapeseed oil (melting point 35° C.) | — | — | — |
| Fresh cream | 90 | 80 | 70 |
| Lecithin | — | — | — |
| Riken Oil Super 80 | 0.1 | 0.1 | 0.1 |
| Constituent fatty acid composition of non-milk fat in the fat ingredient | | | |
| Lauric acid + palmitic acid | 56.1 | 56.1 | 56.1 |
| Oleic acid + linoleic acid + linolenic acid | 21.1 | 21.1 | 21.1 |
| Linoleic acid + linolenic acid | 1.7 | 1.7 | 1.7 |
| Milk fat/total fat | 0.91 | 0.82 | 0.73 |
| Aqueous phase | | | |
| Water | 5.27 | 10.8 | 16.2 |
| Skim milk powder | 0.5 | 1 | 1.5 |
| Pentaglycerol monomyristate (HLB13) | 0.02 | 0.04 | 0.06 |
| αG rutin PS | 0.01 | 0.01 | 0.01 |
| Sodium metaphosphate | 0.1 | 0.1 | 0.1 |
| Whipping time | 1'10" | 1'20" | 1'45" |
| Overrun (%) | 75 | 80 | 84 |
| Shape retention at 15° C. | Excellent | Excellent | Excellent |
| Taste immediately after whipping | 4.7 | 4.6 | 4.5 |
| Taste after 12 hours photo-irradiation | 3.9 | 4.2 | 4.4 |
| Taste after 24 hours photo-irradiation | 2.8 | 3.3 | 3.8 |
| Taste after 72 hours photo-irradiation | 1.0 | 1.3 | 1.8 |

COMPARATIVE EXAMPLE 3

An aqueous phase was prepared by adding 0.3 part of lecithin to 20.0 parts of hydrogenated rapeseed oil (melting point 35° C.) and 20.0 parts of hydrogenated palm kernel oil (melting point 34° C.), and mixing and melting the mixture. Separately, an aqueous phase was prepared by dissolving 5.0 parts of skim milk powder, 0.2 part of sucrose fatty acid ester and 0.1 part of sodium metaphosphate in 54.4 parts of water. The oil phase and the aqueous phase were pre-emulsified by stirring with a homomixer at 65° C. for 30 minutes, sterilized by direct heating with a ultra high temperature heater (manufactured by IWAI Engineering System Co., Ltd.) at 145° C. for 4 seconds, homogenized at homogenizing pressure of 50 kg/cm², and immediately cooled to 5° C. After cooling, the product was aged for 24 hours to obtain a whippable oil-in-water type emulsion. The emulsion was evaluated according to the above B. Evaluation method of oil-in-water type emulsion upon whipping. The results are summarized in Table 9.

COMPARATIVE EXAMPLES 4 AND 5

According to the formulations in Table 9 and the same manner as that described in Comparative Example 3, whippable oil-in-water type emulsions according to Comparative Examples 4 and 5 were obtained. These emulsions were evaluated according to the above B. Evaluation method of oil-in-water type emulsion upon whipping. The results are summarized in Table 9.

TABLE 9

|  | Comparative Examples | | |
|---|---|---|---|
|  | 3 | 4 | 5 |
| Oil phase | | | |
| Palm mid-fraction (melting point 34° C.) | — | — | — |
| Hydrogenated palm kernel oil (melting point 34° C.) | 20.0 | 4.5 | — |
| Hydrogenated rapeseed oil (melting point 35° C.) | 20.0 | 4.5 | 40.0 |
| Fresh cream | — | 70 | — |
| Lecithin | 0.3 | 0.09 | 0.3 |
| Riken Oil Super 80 | — | — | — |
| Constituent fatty acid composition of non-milk fat in the fat ingredient | | | |
| Lauric acid + palmitic acid | 30.2 | 30.2 | 4.2 |
| Oleic acid + linoleic acid + linolenic acid | 43.6 | 43.6 | 81.7 |
| Linoleic acid + linolenic acid | 1.7 | 1.7 | 6.2 |
| Milk fat/total fat | 0.00 | 0.79 | 0.00 |
| Aqueous phase | | | |
| Water | 54.40 | 19.25 | 54.40 |
| Skim milk powder | 5.0 | 1.5 | 5.0 |
| Pentaglycerol monomyristate (HLB13) | — | — | — |
| Sucrose fatty acid ester (HLB5) | 0.2 | 0.06 | 0.2 |
| αG rutin PS | — | — | — |
| Sodium metaphosphate | 0.1 | 0.1 | 0.1 |
| Whipping time | 3'30" | 2'30" | 3'45" |
| Overrun (%) | 110 | 95 | 100 |
| Shape retention at 15° C. | Excellent | Excellent | Excellent |
| Taste immediately after whipping | 4.0 | 4.5 | 3.9 |
| Taste after 12 hours photo-irradiation | 3.3 | 2.1 | 2.7 |
| Taste after 24 hours photo-irradiation | 2.8 | 1.6 | 2.3 |
| Taste after 72 hours photo-irradiation | 2.4 | 1.0 | 1.9 |

The Second Embodiment

The oil-in-water type emulsion according to the second embodiment is a nonfat milk solid-containing oil-in-water type emulsion for light-exposed food, and comprises 1 to 12% by weight of the fat ingredient and 3 to 26% by weight of nonfat milk solids are 3 to 26% by weight, wherein the non-milk fat has such a constituent fatty acid composition that the total amount of lauric acid and palmitic acid is not less than 40%, the total amount of oleic acid, linoleic acid and linolenic acid is not more than 50%, and the total amount of linoleic acid and linolenic acid is not more than 5%. The ratio of the nonfat milk solids to the fat ingredient in the oil-in-water type emulsion is not less than 1 relative to 1 of the fat ingredient. Therefore, in the present invention, this emulsion is referred to as the nonfat milk solid-containing oil-in-water type emulsion.

In the nonfat milk solid-containing oil-in-water type emulsion, as the fat ingredient of the present invention, any fat can be selected and used as long as the non-milk fat in the fat ingredient has such a constituent fatty acid composition that the total amount of lauric acid and palmitic acid is not less than 40%, the total amount of oleic acid, linoleic acid and linolenic acid is not more than 50%, and the total amount of linoleic acid and linolenic acid is not more than 5%. Preferably, the non-milk fat in the fat ingredient has such a constituent fatty acid composition that the total amount of lauric acid and palmitic acid is not less than 50%, more preferably not less than 55%, the total amount of oleic acid, linoleic acid and linolenic acid is not more than 40%, more preferably not more than 35%, and the total amount of linoleic acid and linolenic acid is not more than 4%, more preferably not more than 3%. Specifically, for example, animal and vegetable fat, hydrogenated fat thereof, and various chemically or physically processed products thereof can be used alone or in combination of two or more thereof. Examples of the source of the fat include various animal and vegetable fat such as soybean oil, cottonseed oil, corn oil, safflower oil, olive oil, palm oil, rapeseed oil, rice bran oil, sesame oil, kapok oil, palm oil, palm kernel oil, lard, fish oil, whale oil, etc., and their processed products (having melting point of about 15 to 40° C.) such as hydrogenated, fractioned, or interesterified oil thereof. Among them, combinations of lauric fat such as coconut oil and palm kernel oil with palm oil are preferable.

When the fat ingredient is less than 1% by weight, the emulsion itself has poor body taste, which results in bad taste upon blending into pudding, and in case of custard pudding, the product has weak and brittle texture. When more than 12% by weight, concentrated milk-like property is hardly obtainable, and when blending into pudding, the product has hard texture and oily taste, which makes it difficult to obtain pudding having its original mouthfeel.

As used herein, nonfat milk solids are an ingredient remaining after removal of milk fat from whole solids of cow milk. Examples thereof include those derived from milk such as fresh milk, cow milk, defatted milk, fresh cream, concentrated milk, unsweetened condensed milk, sweetened condensed milk, whole milk powder, skim milk powder, buttermilk powder, whey protein, casein, casein sodium, etc. The content of nonfat milk solids is preferably 3 to 26% by weight. When nonfat milk solids are less than 3% by weight, taste is subtle and, in case of custard pudding, the product has bad shape retention due to insufficient gelling strength and has jelly-like mouthfeel. When higher than 26% by weight, tissue becomes too hard and a cost is also high, and thus it is difficult to achieve an effect commensurate with an amount.

As the emulsifier to be used in the present invention, an emulsifier usually used in preparation of a nonfat milk solid-containing oil-in-water type emulsion can be selected and used appropriately. Examples of the emulsifier include synthetic emulsifiers such as lecithin, monoglyceride, sorbitan fatty acid ester, propylene glycol fatty acid ester, polyglycerol fatty acid ester, polyoxyethylenesorbitan fatty acid ester, sucrose fatty acid ester, etc. Among these emulsifiers, one or more of them may be selected and used appropriately. Among these emulsifiers, from the viewpoint of less deterioration as off-taste and off-flavor by photo-irradiation, an emulsifier free from an unsaturated fatty acid as a constituent fatty acid is preferably used.

The nonfat milk solid-containing oil-in-water type emulsion of the present invention preferably contains tocopherol as a taste deterioration preventing agent.

Tocopherol to be used in the present invention itself is known and commercially available. It may be purified extract from natural plant or unpurified extract, or may be a synthetic product. In addition, it may be δ-tocopherol alone or a mixture of α, β, γ and δ-tocopherols, etc., with that containing less α and high δ being preferred. Further, it may be used in the form of a preparation diluted with fat, dextrin, and the like. Examples of a commercial product include Riken Oil Super 80 (trade name, manufactured by Riken Vitamin Co., Ltd.; tocopherol content 64%), and the like.

The amount of tocopherol to be used in the nonfat milk solid-containing oil-in-water type emulsion of the present invention is 0.05 to 1.5% by weight, preferably 0.07 to 1.3% by weight, and most preferably 0.1 to 1.0% by weight.

When the amount of tocopherol is too low, it is difficult to obtain the expected effect, and when it is too high, taste and color of the nonfat milk solid-containing oil-in-water type emulsion are deteriorated.

The above-described taste deterioration preventing agent used in the nonfat milk solid-containing oil-in-water type emulsion of the present invention can achieve the desired effect by containing tocopherol as an efficient ingredient, and if necessary, may also contains a known antioxidant (e.g., L-ascorbic acid, etc.), a flavor deterioration preventing agent (e.g., chlorogenic acid, apple polyphenol, sunflower extract, bayberry extract, rutin, catechin, etc.) and a metal chelating agent (e.g., gluconic acid, kojic acid, phytic acid, polyphosphoric acid, chitin, chitosan, etc.).

Timing of addition of the taste deterioration preventing agent used in the nonfat milk solid-containing oil-in-water type emulsion of the present invention is not specifically limited, but should be before the nonfat milk solid-containing oil-in-water type emulsion of the present invention are undergone photodegradation. The taste deterioration preventing agent may be added when preparing the nonfat milk solid-containing oil-in-water type emulsion, or may be added when the nonfat milk solid-containing oil-in-water type emulsion is blended into pudding and the like after preparation of it. Preferably, it is blended together with other ingredients when preparing the nonfat milk solid-containing oil-in-water type emulsion.

In the nonfat milk solid-containing oil-in-water type emulsion of the present invention, various salts can be used. As the salts, preferably, hexametaphosphate, secondary phosphate, sodium citrate, polyphosphate, sodium bicarbonate and the like are used alone or in combination of two or more thereof. If necessary, other ingredients such as sugars, a stabilizer, a flavor, a colorant, a preservative and the like may also be used.

The nonfat milk solid-containing oil-in-water type emulsion of the present invention may be formulated at a concentration suitable for direct use or in the form of a concentrate for appropriately diluting. When the emulsion having a composition similar to cow milk is required, preferably, 3 to 4% by weight of the fat ingredient, 8 to 9% by weight of nonfat milk solids and 87 to 89% by weight of water are formulated. Further, the nonfat milk solid-containing oil-in-water type emulsion can be provided in form of a concentrate suitable for about 2 to 5-fold dilution. For example, when the emulsion having a composition similar to concentrated milk is required, preferably, 9 to 12% by weight of the fat ingredient, 24 to 27% by weight of nonfat milk solids and 67 to 61% by weight of water are formulated. At this time, preferably, amounts of an emulsifier, etc. are increased according to the required degree of dilution. Thus, it is possible to adjust a proportion of the fat ingredient and nonfat milk solids appropriately, and it is possible to select suitably from light taste to rich taste.

As the process for producing the nonfat milk solid-containing oil-in-water type emulsion of the present invention, after mixing ingredients, mainly, the fat ingredient, nonfat milk solids and water, the mixture can be subjected to pre-emulsifying treatment and then pasteurizing or sterilizing treatment, followed by homogenization. From the viewpoint of storing property of the nonfat milk solid-containing oil-in-water type emulsion, sterilizing treatment is preferred. Specifically, the ingredients are pre-emulsified at 60 to 70° C. for 20 minutes (the emulsifying apparatus is a homomixer), and if necessary, homogenized under conditions of 0 to 250 kg/cm² (the emulsifying apparatus is a homogenizer). Then, the mixture is treated with ultra high temperature heating (UHT) sterilization, and then homogenized again under conditions of 0 to 300 kg/cm², cooled and then aged for about 24 hours.

There are two methods of ultra high temperature heating (UHT) sterilization, i.e., indirect heating and direct heating. Examples of an indirect heating apparatus include, but not limited to, APV plate-type UHT treatment apparatus (manufactured by APV Co., Ltd.), CP-UHT sterilizer (manufactured by Climaty Package Co., Ltd.), Stork tubular-type sterilizer (manufactured by Stork Food & Dairy Systems Inc.), Contherm scraped surface UHT sterilizer (manufactured by Tetra pak Alfa-Laval Co., Ltd.) and the like. Examples of a direct heating sterilizer include UHT sterilizer such as ultra high temperature Pasteurizer (manufactured by IWAI Engineering System Co., Ltd.), Uperization sterilizer (manufactured by Tetra pak Alfa-Laval Co., Ltd.), VTIS sterilizer (manufactured by Tetra pak Alfa-Laval Co., Ltd.), Lagear UHT sterilizer (manufactured by Lagear Co., Ltd.), Paralyzator (manufactured by Pash and Silkevogue Co., Ltd.) and the like. Any of these apparatuses may be used.

As described above, the fat ingredient and nonfat milk solids in the nonfat milk solid-containing oil-in-water type emulsion of the present invention can be adjusted within the usable range according to need, and the nonfat milk solid-containing oil-in-water type emulsion of the present invention can be used as a substitute for cow milk and concentrated milk. It may be used for topping on dessert such as pudding, coffee jelly, fruit juice jelly and mousse or may be used for blending, and suitable for blending into pudding, fruit juice jelly, mousse and the like.

A. Evaluation Method of Nonfat Milk Solid-Containing Oil-in-Water Type Emulsion

Assuming that an oil-in-water type emulsion (cream) was topping on dessert such as pudding, coffee jelly, fruit juice jelly and mousse, 30 g of the nonfat milk solid-containing oil-in-water type emulsion was placed in Clean Cup 120BL manufactured by Risu Pack Co., Ltd., and subjected to two taste evaluations of before and after photo-irradiation. Photo-irradiation test was conducted with irradiation from a fluorescent lamp (illuminance: 4000 Lx), and evaluations were conducted after storage at a temperature of 5° C. for 12, 24 and 72 hours. Taste evaluation was based on 5-point scale of "5", "4", "3", "2" and "1" with a higher score assigned for better. An average evaluation was considered as the result. For taste evaluation, an organoleptic test was conducted by 20 expert panelists.

B. Evaluation Method on Custard Pudding

A mixture of 450 g of whole egg and 200 g of granulated sugar was ground well. To this was added 1000 g of the nonfat milk solid-containing oil-in-water type emulsion, which was diluted if necessary, and warmed by heating, and strained with a mesh to obtain a pudding mix. Each 60 g portion of this was gently poured into a heat-resistance pudding cup (manufactured by Toko K.K., made of polypropylene, translucent barreled shape, 90 cc), and the cup was put in a tray containing warmed water at about 40° C. and baked for about 35 minutes in an oven (upper heater at 150° C./bottom heater at 150° C.), and then allowed to cool to obtain custard pudding. Two taste evaluations of before and after photo-irradiation were conducted. Photo-irradiation test was conducted with irradiation from a fluorescent lamp (illuminance: 4000 Lx), and evaluations were conducted after storage at temperature 5° C. Taste evaluation was based on 5-point scale of "5", "4", "3", "2" and "1" with a higher score assigned for better. An average evaluation was considered as the result. For taste evaluation, an organoleptic test was conducted by 20 expert panelists.

TEST EXAMPLE 2

According to a conventional method, the constituent fatty acid compositions of palm mid-fraction (melting point 34° C.), hydrogenated palm kernel oil (melting point 34° C.), milk fat and hydrogenated rapeseed oil (melting point 35° C.) to be used as the fat ingredient for preparing an oil-in-water type emulsion were determined by methyl-esterifying these fats, analyzing by gas chromatography, and identifying and calculating components and their percentages from the area ratios of the analyzed charts. Among fatty acids determined, percentages of lauric acid+palmitic acid, oleic acid+linoleic acid+linolenic acid, linoleic acid+linolenic acid are summarized in Table 10.

TABLE 10

| | Lauric acid + palmitic acid | Oleic acid + linoleic acid + linolenic acid | Linoleic acid + linolenic acid |
|---|---|---|---|
| Palm mid-fraction (melting point 34° C.) | 56.1 | 36.7 | 3.2 |
| Hydrogenated palm kernel oil (melting point 34° C.) | 56.0 | 5.4 | 0.2 |
| Hydrogenated coconut oil (melting point 32° C.) | 57.0 | 0.7 | 0 |
| Hydrogenated soy oil (melting point 31° C.) | 10.4 | 81.5 | 10.7 |
| Hydrogenated rapeseed oil (melting point 35° C.) | 4.2 | 81.7 | 6.2 |

EXAMPLE 37

An oil phase was prepared by using 4.5 parts of palm mid-fraction (melting point 34° C.) and 4.5 parts of hydrogenated palm kernel oil (melting point 34° C.). Separately, an aqueous phase was prepared by dissolving 21.0 parts of skim milk powder, 0.1 part of pentaglycerol monomyristate and 0.2 part of sodium metaphosphate in 69.7 parts of water. The oil phase and the aqueous phase were pre-emulsified by stirring with a homomixer at 65° C. for 30 minutes, sterilized by direct heating with a ultra high temperature heater (manufactured by IWAI Engineering System Co., Ltd.) at 145° C. for 4 seconds, homogenized at homogenizing pressure of 100 kg/cm², and immediately cooled to 5° C. After cooling, the product was aged for 24 hours to obtain a nonfat milk solid-containing oil-in-water type emulsion. The emulsion was evaluated according to the above A. Evaluation method of nonfat milk solid-containing oil-in-water type emulsion. The results summarized listed in Table 11.

EXAMPLE 38

An oil phase was prepared by using 2.0 parts of palm mid-fraction (melting point 34° C.) and 2.0 parts of hydrogenated palm kernel oil (melting point 34° C.). Separately, an aqueous phase was prepared by dissolving 10.0 parts of skim milk powder, 0.1 part of pentaglycerol monomyristate and 0.2 part of sodium metaphosphate in 85.7 parts of water. The oil phase and the aqueous phase were pre-emulsified by stirring with a homomixer at 65° C. for 30 minutes, sterilized by direct heating with a ultra high temperature heater (manufactured by IWAI Engineering System Co., Ltd.) at 145° C. for 4 seconds, homogenized at homogenizing pressure of 100 kg/cm², and immediately cooled to 5° C. After cooling, the product was aged for 24 hours to obtain a nonfat milk solid-containing oil-in-water type emulsion. The emulsion was evaluated according to the above A. Evaluation method of nonfat milk solid-containing oil-in-water type emulsion. The results are summarized in Table 11.

EXAMPLE 39

An oil phase was prepared by using 6.0 parts of palm mid-fraction (melting point 34° C.) and 3.0 parts of hydrogenated palm kernel oil (melting point 34° C.). Separately, an aqueous phase was prepared by dissolving 15.0 parts of skim milk powder, 0.1 part of pentaglycerol monomyristate and 0.2 part of sodium metaphosphate in 75.7 parts of water. The oil phase and the aqueous phase were pre-emulsified by stirring with a homomixer at 65° C. for 30 minutes, sterilized by direct heating with a ultra high temperature heater (manufactured by IWAI Engineering System Co., Ltd.) at 145° C. for 4 seconds, homogenized at homogenizing pressure of 100 kg/cm², and immediately cooled to 5° C. After cooling, the product was aged for 24 hours to obtain a nonfat milk solid-containing oil-in-water type emulsion. The emulsion was evaluated according to the above A. Evaluation method of nonfat milk solid-containing oil-in-water type emulsion. The results are summarized in Table 11.

COMPARATIVE EXAMPLE 6

According to the above A. Evaluation method of nonfat milk solid-containing oil-in-water type emulsion, cow milk (manufactured by Meiji Dairies Corporation, the fat ingredient: not less than 3.7% by weight, nonfat milk solids: not less than 8.5% by weight) was used instead of a nonfat milk solid-containing oil-in-water type emulsion and evaluated. The results are summarized in Table 11.

COMPARATIVE EXAMPLE 7

According to the above A. evaluation method of nonfat milk solid-containing oil-in-water type emulsion commercially available concentrated milk (manufactured by Yotsuba Nyugyo Co., Ltd., the fat ingredient 10.6% by weight, nonfat milk solids 25.2% by weight) was used instead of a nonfat milk solid-containing oil-in-water type emulsion and evaluated. The results are summarized in Table 11.

In Table 11, the formulations and evaluations of Examples 37 to 39 and Comparative Examples 6 and 7 are summarized.

TABLE 11

| | Examples | | | Comparative Example 6 | Comparative Example 7 |
|---|---|---|---|---|---|
| | 37 | 38 | 39 | | |
| Oil phase | | | | | |
| Palm mid-fraction (melting point 34° C.) | 4.5 | 2.0 | 6.0 | — | — |
| Hydrogenated palm kernel oil (melting point 34° C.) | 4.5 | 2.0 | 3.0 | — | — |

TABLE 11-continued

|  | Examples | | | Comparative Example 6 | Comparative Example 7 |
| --- | --- | --- | --- | --- | --- |
|  | 37 | 38 | 39 | | |
| Hydrogenated rapeseed oil (melting point 35° C.) | — | — | — | — | — |
| Cow milk | — | — | — | 100 | — |
| Concentrated milk | — | — | — | — | 100 |
| Riken Oil Super 80 | — | — | — | — | — |
| Constituent fatty acid composition in oil-in-water type emulsion | | | | | |
| Lauric acid + palmitic acid | 56.1 | 56.1 | 56.1 | | |
| Oleic acid + linoleic acid + linolenic acid | 21.1 | 21.1 | 21.1 | | |
| Linoleic acid + linolenic acid | 1.7 | 1.7 | 1.7 | | |
| Aqueous phase | | | | | |
| Water | 69.7 | 85.7 | 75.7 | — | — |
| Skim milk powder | 21.0 | 10.0 | 15.0 | — | — |
| Pentaglycerol monomyristate (HLB13) | 0.1 | 0.1 | 0.1 | — | — |
| Sodium metaphosphate | 0.2 | 0.2 | 0.2 | — | — |
| Taste | 4.8 | 4.3 | 4.6 | 4.9 | 4.8 |
| Taste after 12 hours photo-irradiation | 4.8 | 4.3 | 4.6 | 3.0 | 2.4 |
| Taste after 24 hours photo-irradiation | 4.8 | 4.3 | 4.6 | 2.3 | 2.0 |
| Taste after 72 hours photo-irradiation | 4.7 | 4.2 | 4.5 | 1.6 | 1.3 |

EXAMPLE 40

An oil phase was prepared by adding 0.15 part of tocopherol (trade name: Riken Oil Super 80, manufactured by Riken Vitamin Co., Ltd.; tocopherol content 64%) to 4.5 parts of palm mid-fraction (melting point 34° C.) and 4.5 parts of hydrogenated palm kernel oil (melting point 34° C.), and mixing and melting the mixture. Separately, an aqueous phase was prepared by dissolving 21.0 parts of skim milk powder, 0.1 part of pentaglycerol monomyristate and 0.2 part of sodium metaphosphate in 69.6 parts of water. The oil phase and the aqueous phase were pre-emulsified by stirring with a homomixer at 65° C. for 30 minutes, sterilized by direct heating with a ultra high temperature heater (manufactured by IWAI Engineering System Co., Ltd.) at 145° C. for 4 seconds, homogenized at homogenizing pressure of 100 kg/cm$^2$, and immediately cooled to 5° C. After cooling, the product was aged for 24 hours to obtain a nonfat milk solid-containing oil-in-water type emulsion. The emulsion was diluted with water to 3 times and evaluated according to the above B. Evaluation method on custard pudding. The results are summarized in Table 12.

EXAMPLE 41

An oil phase was prepared by adding 0.45 part of tocopherol (trade name: Riken Oil Super 80, manufactured by Riken Vitamin Co., Ltd.; tocopherol content 64%) to 4.5 parts of palm mid-fraction (melting point 34° C.) and 4.5 parts of hydrogenated palm kernel oil (melting point 34° C.), and mixing and melting the mixture. Separately, an aqueous phase was prepared by dissolving 21.0 parts of skim milk powder, 0.1 part of pentaglycerol monomyristate and 0.2 part of sodium metaphosphate in 69.3 parts of water. The oil phase and the aqueous phase were pre-emulsified by stirring with a homomixer at 65° C. for 30 minutes, sterilized by direct heating with a ultra high temperature heater (manufactured by IWAI Engineering System Co., Ltd.) at 145° C. for 4 seconds, homogenized at homogenizing pressure of 100 kg/cm$^2$, and immediately cooled to 5° C. After cooling, the product was aged for 24 hours to obtain a nonfat milk solid-containing oil-in-water type emulsion. The emulsion was diluted with water to 3 times and evaluated according to the above B. Evaluation method on custard pudding. The results are summarized in Table 12.

EXAMPLE 42

An oil phase was prepared by adding 0.90 part of tocopherol (trade name: Riken Oil Super 80, manufactured by Riken Vitamin Co., Ltd.; tocopherol content 64%) to 4.5 parts of palm mid-fraction (melting point 34° C.) and 4.5 parts of hydrogenated palm kernel oil (melting point 34° C.), and mixing and melting the mixture. Separately, an aqueous phase was prepared by dissolving 21.0 parts of skim milk powder, 0.1 part of pentaglycerol monomyristate and 0.2 part of sodium metaphosphate in 68.8 parts of water. The oil phase and the aqueous phase were pre-emulsified by stirring with a homomixer at 65° C. for 30 minutes, sterilized by direct heating with a ultra high temperature heater (manufactured by IWAI Engineering System Co., Ltd.) at 145° C. for 4 seconds, homogenized at homogenizing pressure of 100 kg/cm$^2$, and immediately cooled to 5° C. After cooling, the product was aged for 24 hours to obtain a nonfat milk solid-containing oil-in-water type emulsion. The emulsion was diluted with water to 3 times and evaluated according to the above B. Evaluation method on custard pudding. The results are summarized in Table 12.

In Table 12, the formulations and evaluations of Examples 40 to 42 are summarized.

TABLE 12

|  | Examples | | |
| --- | --- | --- | --- |
|  | 40 | 41 | 42 |
| Oil phase | | | |
| Palm mid-fraction (melting point 34° C.) | 4.5 | 4.5 | 4.5 |
| Hydrogenated palm kernel oil (melting point 34° C.) | 4.5 | 4.5 | 4.5 |
| Hydrogenated rapeseed oil (melting point 35° C.) | — | — | — |
| Riken Oil Super 80 | 0.15 | 0.45 | 0.90 |

TABLE 12-continued

|  | Examples | | |
| --- | --- | --- | --- |
|  | 40 | 41 | 42 |
| Constituent fatty acid composition in oil-in-water type emulsion | | | |
| Lauric acid + palmitic acid | 56.1 | 56.1 | 56.1 |
| Oleic acid + linoleic acid + linolenic acid | 21.1 | 21.1 | 21.1 |
| Linoleic acid + linolenic acid | 1.7 | 1.7 | 1.7 |
| Aqueous phase | | | |
| Water | 69.6 | 69.3 | 68.8 |
| Skim milk powder | 21.0 | 21.0 | 21.0 |
| Pentaglycerol monomyristate (HLB13) | 0.1 | 0.1 | 0.1 |
| Sodium metaphosphate | 0.2 | 0.2 | 0.2 |
| Evaluation result on custard pudding | | | |
| Taste before photo-irradiation | 4.8 | 4.8 | 4.8 |
| Taste after 12 hours photo-irradiation | 4.8 | 4.8 | 4.8 |
| Taste after 24 hours photo-irradiation | 4.0 | 4.5 | 4.8 |
| Taste after 72 hours photo-irradiation | 3.5 | 4.1 | 4.8 |

COMPARATIVE EXAMPLE 8

An oil phase was prepared by adding 0.05 part of lecithin to 4.5 parts of hydrogenated palm kernel oil (melting point 34° C.) and 4.5 parts of hydrogenated rapeseed oil (melting point 35° C.), and mixing and melting the mixture. Separately, an aqueous phase was prepared by dissolving 21.0 parts of skim milk powder, 0.1 part of sucrose fatty acid ester and 0.2 part of sodium metaphosphate in 69.7 parts of water. The oil phase and the aqueous phase were pre-emulsified by stirring with a homomixer at 65° C. for 30 minutes, sterilized by direct heating with a ultra high temperature heater (manufactured by IWAI Engineering System Co., Ltd.) at 145° C. for 4 seconds, homogenized at homogenizing pressure of 100 kg/cm$^2$, and immediately cooled to 5° C. After cooling, the product was aged for 24 hours to obtain a nonfat milk solid-containing oil-in-water type emulsion. The emulsion was diluted with water to 3 times and evaluated according to the above B. Evaluation method on custard pudding. The results are summarized in Table 13.

COMPARATIVE EXAMPLE 9

An oil phase was prepared by adding 0.05 part of lecithin to 9.0 parts of hydrogenated rapeseed oil (melting point 35° C.), and mixing and melting the mixture. Separately, an aqueous phase was prepared by dissolving 21.0 parts of skim milk powder, 0.1 part of sucrose fatty acid ester and 0.2 part of sodium metaphosphate in 69.7 parts of water. The oil phase and the aqueous phase were pre-emulsified by stirring with a homomixer at 65° C. for 30 minutes, sterilized by direct heating with a ultra high temperature heater (manufactured by IWAI Engineering System Co., Ltd.) at 145° C. for 4 seconds, homogenized at homogenizing pressure of 100 kg/cm$^2$, and immediately cooled to 5° C. After cooling, the product was aged for 24 hours to obtain a nonfat milk solid-containing oil-in-water type. The emulsion was diluted with water to 3 times and evaluated according to the above B. Evaluation method on custard pudding. The results are summarized in Table 13.

In Table 13, the formulations and evaluations of Comparative Examples 8 and 9 are summarized.

TABLE 13

|  | Comparative Examples | |
| --- | --- | --- |
|  | 8 | 9 |
| Oil phase | | |
| Palm mid-fraction (melting point 34° C.) | — | — |
| Hydrogenated palm kernel oil (melting point 34° C.) | 4.5 | — |
| Hydrogenated rapeseed oil (melting point 35° C.) | 4.5 | 9.0 |
| Cow milk | — | — |
| Lecithin | 0.05 | 0.05 |
| Riken Oil Super 80 | — | — |
| fatty acid composition in whippable oil-in-water type emulsion | | |
| Lauric acid + palmitic acid | 30.2 | 4.2 |
| Oleic acid + linoleic acid + linolenic acid | 43.6 | 81.7 |
| Linoleic acid + linolenic acid | 1.7 | 6.2 |
| Aqueous phase | | |
| Water | 69.7 | 69.7 |
| Skim milk powder | 21.0 | 21.0 |
| Pentaglycerol monomyristate (HLB13) | — | — |
| Sucrose fatty acid ester (HLB5) | 0.1 | 0.1 |
| Sodium metaphosphate | 0.2 | 0.2 |
| Evaluation result on custard pudding | | |
| Taste before photo-irradiation | 4.7 | 4.4 |
| Taste after 12 hours photo-irradiation | 3.7 | 3.3 |
| Taste after 24 hours photo-irradiation | 3.0 | 2.6 |
| Taste after 72 hours photo-irradiation | 2.5 | 2.2 |

INDUSTRIAL APPLICABILITY

The present invention relates to an oil-in-water type emulsion having photodegradation-resistance, which has less deterioration such as off-taste and off-flavor by irradiating light from a fluorescent lamp, etc. The present invention further relates to an oil-in-water type emulsion, which is a whippable oil-in-water type emulsion (whipping cream) used for cake decoration, sandwich filling, and the like. The present invention also relates to a nonfat milk solid-containing oil-in-water type emulsion, which can be used as a substitute for cow milk and concentrated milk, and is suitable for topping on dessert such as pudding and jelly, and for blending into pudding, bavarois, jelly, and the like.

The invention claimed is:
1. A process for producing an oil-in-water type emulsion for light-exposing food comprising:
   mixing ingredients comprising fat, nonfat milk solids, emulsifier and water into a mixture,
   pre-emulsifying the mixture,
   pasteurizing or sterilizing the mixture, and
   homogenizing the mixture,
   wherein the fat consists of non-milk fat, or non-milk fat and milk fat; the non-milk fat has such a constituent fatty acid composition that the total amount of lauric acid and palmitic acid is not less than 40%, the total amount of oleic acid, linoleic acid and linolenic acid is not more than 50%, and the total amount of linoleic acid and linolenic acid is not more than 5%; the ratio of milk fat/total fat is not more than 0.95; the content of nonfat milk solids is 1 to 14% by weight; the amount of the fat ingredient is 15 to 48% by weight; the emulsifier is free from an unsaturated fatty acid; 0.04 to 0.5% by weight of tocopherol and 0.003 to 0.2% by weight of rutin are added to the oil-in-water type emulsion before undergoing photodegradation, and the oil-in-water type emulsion has photodegradation-resistance.

2. The process according to claim 1, wherein the oil-in-water type emulsion is whippable.

3. The process according to claim 1, wherein the photodegradation is caused by irradiating light from a fluorescent lamp.

4. The process according to claim 3, wherein the ratio of milk fat/total fat is 0.32 or more.

5. The process according to claim 4, wherein the emulsifier is polyglycerol fatty acid ester composed of a saturated fatty acid.

6. A method for preventing photodegradation of an oil-in-water type emulsion comprising fat, nonfat milk solids, water, an emulsifier, tochopherol and rutin, comprising:
preparing an oil-in-water type emulsion comprising fat, nonfat milk solids, water, an emulsifier, 0.04 to 0.5% by weight of tocopherol and 0.003 to 0.2% by weight of rutin,
wherein the fat is a non-milk fat, or non-milk fat and milk fat; the non-milk fat has such a constituent fatty acid composition that the total amount of lauric acid and palmitic acid is not less than 40%, the total amount of oleic acid, linoleic acid and linolenic acid is not more than 50% and the total amount of linoleic acid and linolenic acid is not more than 5%; the ratio of milk fat/total fat is not more than 0.95; the content of nonfat milk solids is 1 to 14% by weight; the amount of the fat ingredient is 15 to 48% by weight; the emulsifier is free from an unsaturated fatty acid;
wherein the prepared oil-in-water type emulsion has photodegradation-resistance without prevention of photodegradation with packaging.

7. The process according to claim 6, wherein the photodegradation is caused by irradiating light from a fluorescent lamp.

8. The process according to claim 7, wherein the ratio of milk fat/total fat is 0.32 or more.

9. The process according to claim 8, wherein the emulsifier is polyglycerol fatty acid ester composed of a saturated fatty acid.

10. A process for producing an oil-in-water type emulsion for light-exposing food comprising:
mixing ingredients comprising fat, nonfat milk solids, emulsifier and water into a mixture,
pre-emulsifying the mixture,
pasteurizing or sterilizing the mixture, and
homogenizing the mixture,
wherein the fat consists of non-milk fat and the emulsion is a nonfat milk solid-containing oil-in-water type emulsion comprising 1 to 12% by weight of fat and 3 to 26% by weight of nonfat milk solids; the ratio of the nonfat milk solids to the fat ingredient in the oil-in-water type emulsion is not less than 1 relative to 1 of the fat ingredient; the non-milk fat has such a constituent fatty acid composition that the total amount of lauric acid and palmitic acid is not less than 40%, the total amount of oleic acid, linoleic acid and linolenic acid is not more than 50% and the total amount of linoleic acid and linolenic acid is not more than 5%; the emulsifier is free from an unsaturated fatty acid; 0.04 to 0.5% by weight of tocopherol and 0.003 to 0.2% by weight of rutin are added to the oil-in-water type emulsion before undergoing photodegradation, and the oil-in-water type emulsion has photodegradation-resistance.

11. The process according to claim 10, wherein the oil-in-water type emulsion is an emulsion for blending use.

12. The process according to claim 10, wherein the oil-in-water type emulsion is an emulsion for blending into pudding, bavarois or jelly.

13. The process according to claim 10, wherein the photodegradation is caused by irradiating light from a fluorescent lamp.

14. The process according to claim 13, wherein the emulsifier is polyglycerol fatty acid ester composed of a saturated fatty acid.

* * * * *